July 6, 1948.   J. F. INGHAM   2,444,701
PIPE HANGER
Filed Aug. 24, 1945

INVENTOR.
John F. Ingham
BY
ATTORNEY

Patented July 6, 1948

2,444,701

UNITED STATES PATENT OFFICE 2,444,701

PIPE HANGER

John F. Ingham, Wilton, Conn.

Application August 24, 1945, Serial No. 612,357

4 Claims. (Cl. 248—62)

This invention relates to new and useful improvements in pipe hangers and has particular relation to a pipe hanger which may be easily and quickly assembled on a job without the use of special tools.

The objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

Figure 1:
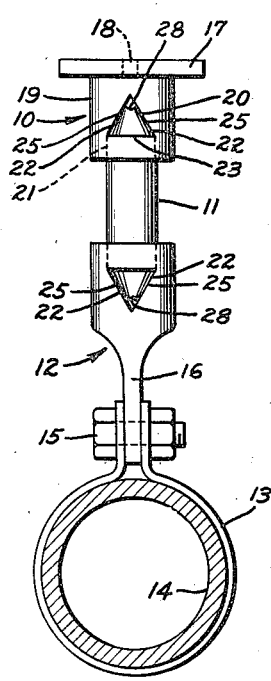
Fig. 1 is an elevational view showing a complete pipe hanger made in accordance with the invention.
Figure 2:
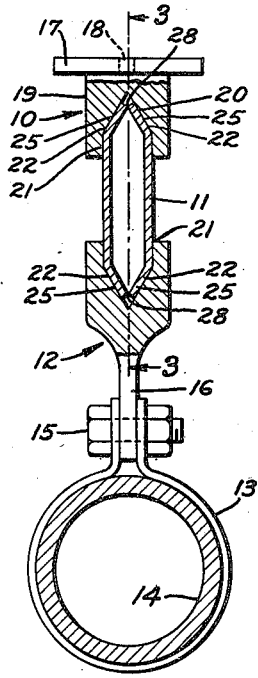
Fig. 2 is a longitudinal sectional view taken as along the line 2—2 of Fig. 3.

Referring in detail to the drawing, and at first more particularly to Figs. 1-5, the pipe hanger of the invention is shown as including an element or member 10 to be fastened to a beam or the like, a piece of copper tubing 11, and an element generally designated 12 connected to and supported from the element 10 by the copper tubing 11. A band of metal 13 is shown surrounding a pipe 14, being supported, and such band is connected by a bolt 15 with an anchoring means in the form of a depending flat lug 16 comprising an integral part of the element 12.

Element 10 includes an anchoring means in the form of a base flange or plate 17 adapted for the mounting of the element or any suitable support as, for example, a beam. Plate 17 is provided with holes or openings 18 for the passage of securing screws or the like. From the base plate depends or projects a body 19 integral with such plate and therewith making up the element 10.

Body 19 has a wedge-shaped opening or window 20 at each of a pair of opposite sides and in addition at its outer or free end is open or provided with an entrance 21. This entrance is simply circular and extends as for example to the point indicated at 23 in Figs. 1 and 3. From such point 23 the sides of the socket or recess within the body 19 are tapered or inclined toward one another as at 22. This taper is the same as that of the sides or edges of the openings or windows 22 so that extending diametrically through the body are the tapered walls 22 providing a wedge-shaped socket structure.

Figure 3:
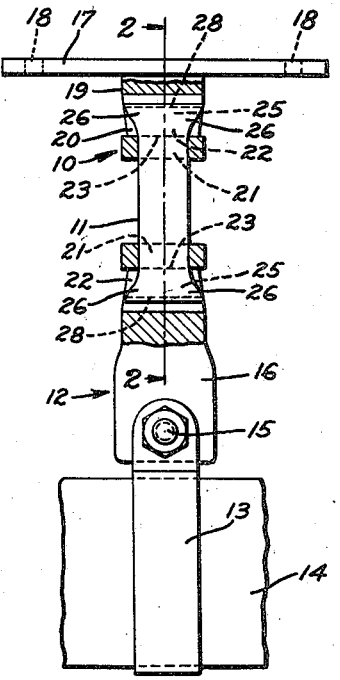
Fig. 3 is a sectional view at right angles to Fig. 2 and taken as along the line 3—3 of the latter.
Figure 4:
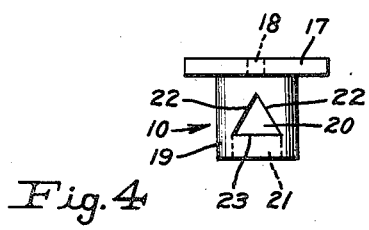
Fig. 4 is an elevational view of one element of the pipe hanger.
Figure 5:
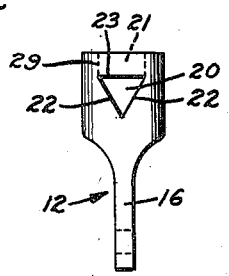
Fig. 5 is a similar view of the other element thereof.

With this construction the end of the copper tube 11, such end now being circular and of the same form as the remainder of the tube, is inserted into the opening or entrance 21 and enters freely therein to the point 23 where the internal wedge-shape of element 10 commences. Now the copper tubing may be driven into the socket of the element 10 whereupon the leading end of the tube is forced to conform to the wedge-shape as at 25 in Fig. 2 and to spread laterally to form ear-like portions 26 as shown in Fig. 3. These ear-like portions enter into the openings or windows 20.

As the leading end portion of the tube has been so deformed it will be clear from Fig. 3 that the tube may not be pulled out from the body 19 without shearing off the ears 26. That is, these ears have spread laterally with respect to the entrance opening 21 of the body. Shearing off of these ears is not easily accomplished and collapsing of them toward one another is not possible under any normal conditions. This is true since when the tube is deformed or collapsed as it is driven into the socket, its leading end is closed as suggested at 28 and this closed end forms a bridge or brace between the ears 26 so that the latter are not easily forced toward one another.

Element 12 in addition to the lug 16 includes a body 29 having the entrance opening 21, the side openings or windows 20, and the inclined walls 22 beginning at the inner end 23 of the entrance opening 21. A copper tube driven into the socket of body 29 will be deformed and locked in such body in exactly the manner described in connection with the element 10.

Figure 6:
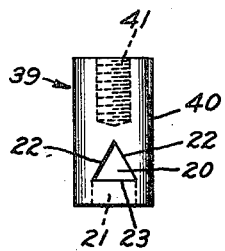
Fig. 6 is an elevational view showing a slightly modified construction.
Figure 7:
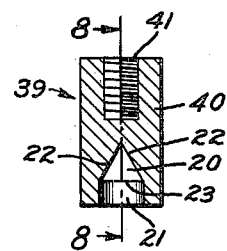
Fig. 7 is a central longitudinal sectional view through the modified construction of Fig. 6, the view being taken as along the line 7—7 of Fig. 8.
Figure 8:
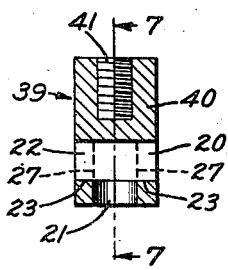
Fig. 8 is a central longitudinal sectional view taken as along the line 8—8 of Fig. 7.

Referring now to Figs. 6, 7 and 8, the element there shown is adapted to be substituted for the element 10 first described. In the modification the element generally designated 39 includes a body 40 having an entrance 21, the limit of which is indicated at 23 since inwardly of the line 23 are the tapered walls 22. These walls extend entirely through the device and terminate at the outer sides thereof as such walls define the side limits of the openings or windows 20 previously referred to. In Fig. 8 the dotted lines 27 indicate the inner limits of the openings or windows 20 although it will be understood that in the actual device no such lines appear since the walls 22 extend entirely through the body.

In this modification, no mounting or base plate is provided on the body 40 but the same in its inner end is provided with an anchoring means in the form of a tapped socket 41 adapted for the reception of a threaded stud of suitable length. This stud would be secured in any suitable insert provided in the building or the like and is only to take the place, so far as the present invention is concerned, of the plate 17 previously described.

The purpose of the present construction is to avoid the use of preformed nipples in the making of a pipe hanger. Heretofore with constructions provided, it has been necessary ether that the workmen take a large assortment of nipples with them to any particular job or that on the job they cut nipples to length and thread them. In the first instance it is almost impossible to anticipate every length of nipple that will be required and in the second instance a great deal of time is consumed in making up the nipples on the job.

With the device of the invention, a reel of any desired number of lengths of copper tubing is taken to the job together with a supply of elements 10 and 12, or 12 and 39. At the job each pipe hanger used is more or less tailored to the job. In each case the proper length of copper tubing is simply cut from the supply and (using the construction of Figs. 1–3) one end of the tube may be inserted in the entrance of element 10 and the other end of the tube located in the entrance of element 12. Thereafter one element or the other is disposed against an anvil of any kind and a mallet or hammer or the like is used to drive against the outer end of the other element. In this way the elements are fastened onto the respective ends of the copper tubing.

In addition to the openings or windows 20 providing for the lateral spread of the tube in the formation of the locking ears 26, such windows or openings also enable the workmen to see the exact positions of the ends of the tubes in the respective bodies. Thus, the workmen can tell at a glance whether the assembly is complete or whether further driving or hammering of the parts together is necessary. The operation of forming the pipe hanger using an element 39 in place of an element 10 will be exactly the same as that already described as the end of the tube is wedged in the socket of the element 39 by hammering or the like.

Having thus set forth the nature of my invention, what I claim is:

1. In a pipe hanger, a pair of elements each having a circular entrance opening and a V-shaped socket inwardly of said opening and also extending laterally thereof at a pair of diametrically opposite points, a tube of deformable metal entering each of said elements through the entrance of the latter and deformed laterally inwardly of such entrance whereby withdrawal of the tube is prevented.

2. In a pipe hanger, a pair of elements each having a circular entrance opening and a V-shaped socket inwardly of said opening and also extending laterally thereof at a pair of points, a tube of deformable metal entering each of said elements through the entrance of the latter and deformed laterally inwardly of such entrance whereby withdrawal of the tube is prevented.

3. In a pipe hanger, a pair of elements each having a circular entrance opening and a V-shaped socket inwardly of said opening and extending laterally thereof in at least one direction, a tube of deformable metal entering each of said elements through the entrances of the latter and inwardly of such entrances deformed laterally into the laterally extending portions of the sockets whereby withdrawal of the tube from the elements is prevented.

4. An element for use in a pipe hanger, said element comprising an elongated body of uniform external diameter having an entrance opening through one end, an anchoring means at the other end of the body, said body having a wedge-shaped socket portion inwardly of and communicating with said entrance opening and said socket portion extending laterally of said opening in at least one direction.

JOHN F. INGHAM.

REFERENCES CITED

The following references are of record in the file of this patent:

UNITED STATES PATENTS

| Number | Name | Date |
|---|---|---|
| 826,161 | Hayden | July 17, 1906 |